Nov. 4, 1924.　　　　　　　　　　　　　　　　1,514,510
G. D. FENTIMAN
THREE-ROW CRUST BUSTER
Filed April 4, 1923　　2 Sheets-Sheet 1

INVENTOR.
G. D. Fentiman
BY
Watson E. Coleman
ATTORNEY.

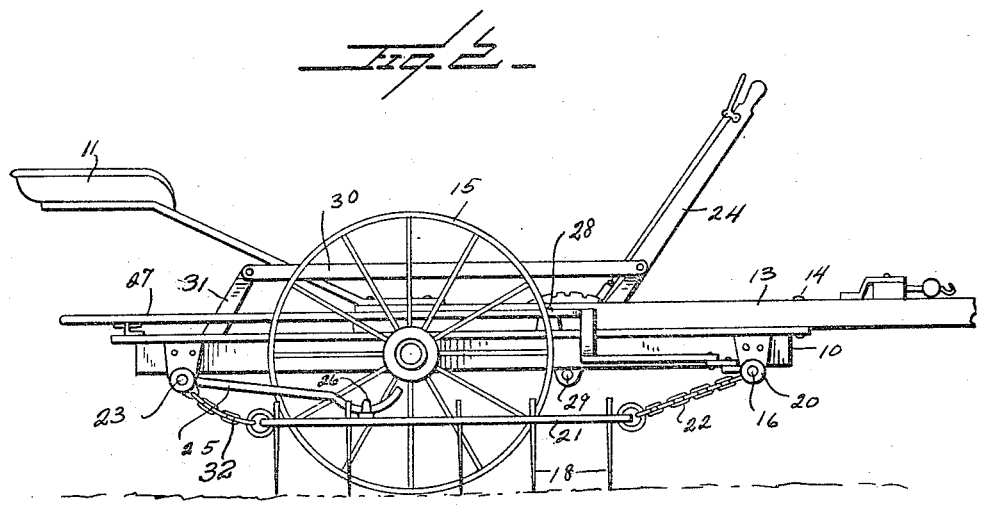
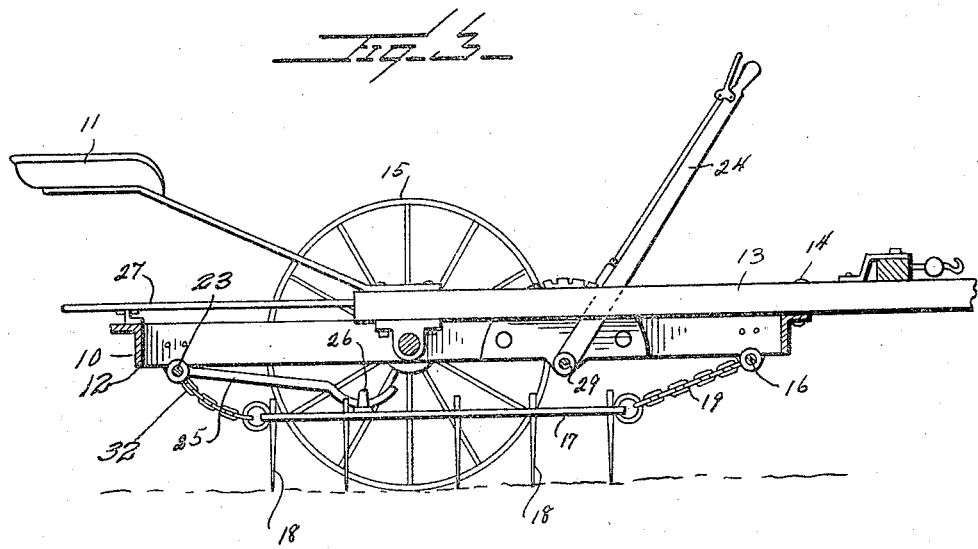

Patented Nov. 4, 1924.

1,514,510

UNITED STATES PATENT OFFICE.

GEORGE D. FENTIMAN, OF STILLWATER, OKLAHOMA.

THREE-ROW CRUST BUSTER.

Application filed April 4, 1923. Serial No. 629,893.

*To all whom it may concern:*

Be it known that I, GEORGE D. FENTIMAN, a citizen of the United States, residing at Stillwater, in the county of Payne and State of Oklahoma, have invented certain new and useful Improvements in Three-Row Crust Busters, of which the following is a specification, reference being had to the accompanying drawings.

This invention relates to what are known as busters for breaking crusted ground, and particularly designed to be used on listed or any other rowed crop, and the general object of the invention is to provide a buster of this character which is simple in construction, may be easily operated, and which will thoroughly break up the ground between rows of plants.

A further object is to provide a construction of this character wherein three sets of harrow teeth supporting frames are provided which are flexibly mounted upon the main frame of the machine so that they may independently rise and fall with relation to each other to suit the contour of the ground.

A still further object is to provide means whereby all of the teeth supporting frames may be raised or lowered to carry them out of or into engagement with the ground.

Another object is to provide means whereby the two outermost frames may be adjusted toward or from the main frame of the device so as to operate on narrower or wider roads.

Other objects have to do with the details of construction and arrangement of parts as will appear more fully hereinafter.

My invention is illustrated in the accompanying drawings, wherein:—

Figure 2 is a side elevation of the machine shown in Figure 1;

Figure 3 is a longitudinal sectional view through the middle frame.

Figure 1:
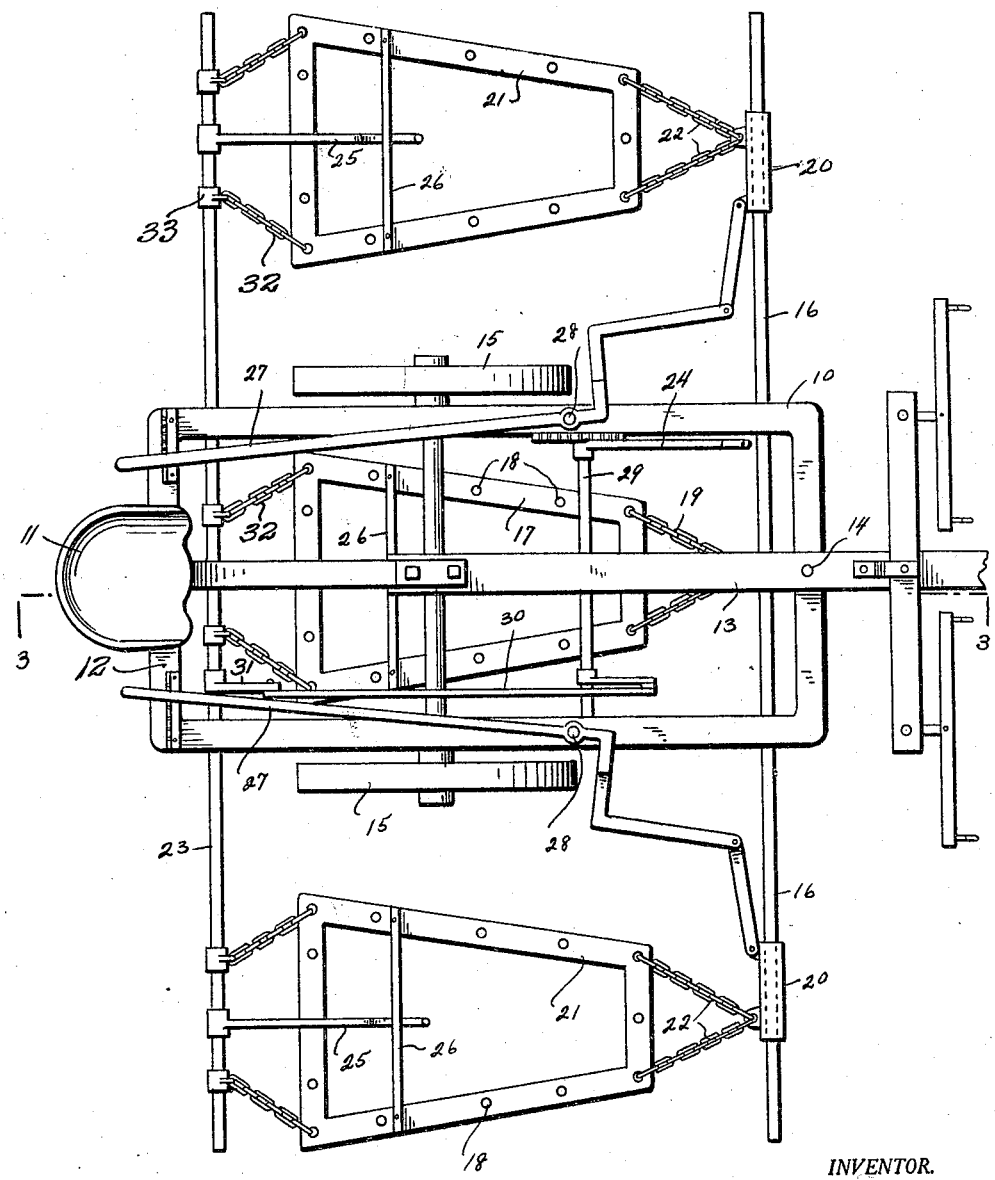
Figure 1 is a top plan view of a crust busting machine constructed in accordance with my invention.

In the drawings, 10 designates a main frame which is approximately rectangular in form and which may be made of any suitable material. This frame may be of wooden beams, angle iron, channel iron, or tubular material. The rear end of the main frame carries a seat 11, and extending across the main frame is the brace 12 to which the rear end of the tongue 13 is bolted, this tongue being also connected to the main frame at 14 so that the tongue is held from oscillation. The frame is supported by ground engaging traction wheels 15 on each side of the main frame.

Extending transversely across the front of the main frame is a draft bar 16 which may be of iron pipe or of any other suitable and like material. Connected to the middle of this pipe and within the area bounded by the main frame is a somewhat triangular harrow frame 17 which carries downwardly extending harrow teeth 18. This frame may be formed of any suitable material. The forward end of the frame is pivotally connected by link chains 19 to the transverse bar 16. Mounted upon the projecting ends of the transverse bar 16 are the sleeves 20 which are longitudinally shiftable upon the bar, and connected to each of these sleeves and extending rearward therefrom is a substantially triangular harrow frame 21 having downwardly projecting harrow teeth. Each frame 21 is connected by link chains 22 to the corresponding sleeve 20.

Thus it will be seen that all of the harrow frames 18 and 21 are mounted for free pivotal movement in a vertical plane so that each of the harrow frames may travel over the ground independently of any other harrow frame. The harrow frames are adapted to be lifted entirely from the ground by means of a transverse shaft 23 having a handle 24 disposed adjacent the driver's seat, this shaft being provided at three points in its length with hooks or like instrumentalities 25, each harrow frame having a transverse cross bar 26 with which the hook is adapted to engage. It will be obvious, therefore, that upon a movement of the handle 24 rearward, all three of the harrow frames will be raised and when the handle is moved forward all three of the harrow frames are lowered.

For the purpose of shifting the lateral harrow frames 21 toward and from the middle harrow frame 17, I provide levers 27 pivoted at 28 upon the main frame, these levers being operatively connected at their ends to the sleeves 20 and having means whereby they may be held in adjusted positions. Any suitable draft appliance may be connected to the tongue 13 but ordinarily two horses will be used with this crust buster.

While the handle 24 might be mounted directly upon the shaft 23, I do not prefer this construction and I have illustrated the handle 24 as being mounted upon a shaft 29 having a crank arm at one end connected by a link 30 to a crank arm 31 mounted upon the shaft 23. Preferably chains will be used as the means for connecting the harrows to the sleeves 20 and to the cross bar 16. The rear ends of the harrow frames are connected preferably by chains 32 to collars 33 on the transverse pipe 23.

The use of this machine will be obvious. The wheels travel between the rows, the middle harrow frame 18 will travel between two rows and the harrow frames 21 will travel between two other rows so that three rows can be cultivated or the ground loosened and broken up at once. The harrows may be adjusted for different widths of rows, and inasmuch as the harrows are flexibly mounted at their forward ends, they will more or less conform to the contour of each row without affecting the other harrows.

I claim:—

1. An implement of the character described comprising a main frame, a transverse bar connected thereto, a medially disposed harrow frame flexibly connected to the bar and disposed within the main frame, lateral harrow frames flexibly connected to said bar disposed exterior to the main frame, means for adjusting the two outside harrow frames toward or from the main frame comprising independently operable levers mounted upon the main frame, and operative connections between each lever and the corresponding forward end of the lateral harrow frame.

2. An agricultural implement comprising a wheeled supported main frame, a transverse bar carried thereby at its forward end and projecting beyond the main frame, sleeves mounted upon the bar, manually operable means for adjusting said sleeves toward or from each other, harrow frames flexibly connected one to each sleeve and extending rearward therefrom, an intermediate harrow frame flexibly connected to said bar and disposed within the main frame, and means for simultaneously raising or lowering all of said harrow frames, said means permitting lateral movement of the harrow frame.

3. An implement of the character described comprising a main frame, wheels supporting the same, a tongue connected to the main frame, a bar carried by the main frame and projecting laterally beyond the same, sleeves mounted upon the bar, laterally disposed harrow frames flexibly connected to said sleeves and disposed one on each side of the main frame and extending rearward therefrom, an intermediate harrow frame flexibly connected to the bar and disposed within the main frame, a pair of levers mounted upon the main frame and operatively connected each to one of said sleeves whereby the lateral harrow frames may be adjusted toward or from the main frame.

4. An implement of the character described comprising a main frame, wheels supporting the same, a tongue connected to the main frame, a bar carried by the main frame and projecting laterally beyond the same, sleeves mounted upon the bar, laterally disposed harrow frames flexibly connected to said sleeves and disposed one on each side of the main frame and extending rearward therefrom, an intermediate harrow frame flexibly connected to the bar and disposed within the main frame, means mounted upon the main frame and engaging the sleeves whereby the sleeves may be shifted laterally on the bar, a rear bar mounted upon the main frame, said bar being oscillatable, means flexibly connecting the rear ends of the main and intermediate harrows to said bar, means on said bar engaging the rear ends of all of said harrows whereby the harrows may be lifted upon a rocking movement given to the bar, and manually operable means for rocking the bar.

In testimony whereof I hereunto affix my signature.

GEORGE D. FENTIMAN.